No. 691,811. Patented Jan. 28, 1902.
C. W. REED & J. HAKEL.
PRUNING SHEARS.
(Application filed June 28, 1901.)
(No Model.)
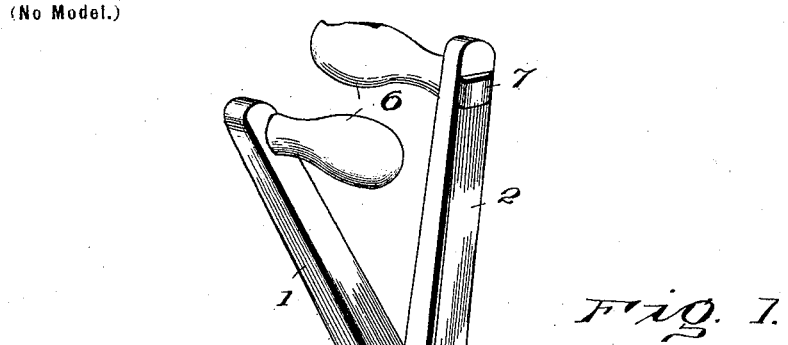
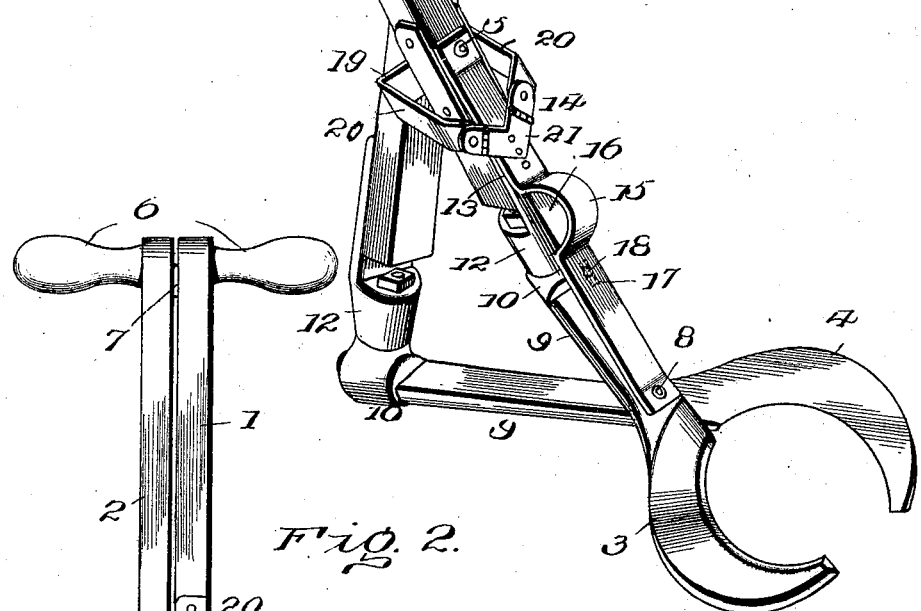
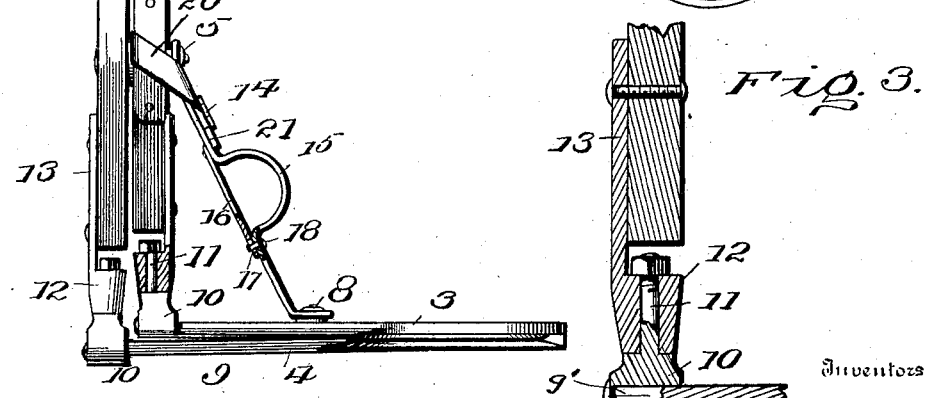
Witnesses
Inventors
Chas. W. Reed
John Hakel
By Attorneys
THE NORRIS PETERS CO., PHOTO-LITHO., WASHINGTON, D. C.

UNITED STATES PATENT OFFICE.

CHARLES W. REED AND JOHN HAKEL, OF HOOD RIVER, OREGON.

PRUNING-SHEARS.

SPECIFICATION forming part of Letters Patent No. 691,811, dated January 28, 1902.

Application filed June 28, 1901. Serial No. 66,410. (No model.)

*To all whom it may concern:*

Be it known that we, CHARLES W. REED and JOHN HAKEL, citizens of the United States, residing at Hood River, in the county of Wasco and State of Oregon, have invented certain new and useful Improvements in Pruning-Shears; and we do hereby declare the following to be a full, clear, and exact description of the invention, such as will enable others skilled in the art to which it appertains to make and use the same.

This invention provides an implement particularly adapted for pruning strawberry-plants when it is required to cut off the tops and runners, the construction being such as to enable the runners to be lifted and lopped off without requiring the operator to stoop, thereby greatly facilitating the work and reducing the manual effort and labor to the smallest degree possible.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of a pruning implement constructed in accordance with and embodying the essential features of this invention. Fig. 2 is a side elevation, parts broken away. Fig. 3 is a detail view in perspective of the elements forming the joint or swivel connection between a handle-bar and a blade.

Corresponding and like parts are referred to in the following description and indicated in all the views of the drawings by the same reference characters.

The implement comprises pivoted handle-bars 1 and 2 and sickle-blades 3 and 4, the latter being pivoted at a point between their ends and connected by a swivel-joint with the handle-bars. The handle-bars are connected a short distance from their lower ends by means of a bolt or pivot fastening 5 and are provided at their upper ends with grips 6, which project in diametrically opposite directions, so as to avoid interference and free operation of the handle-bars. A plate 7 is secured to the inner side of a handle-bar near its upper end and tapers in opposite directions from a central point and serves to prevent catching of the upper ends of the handle-bars when brought together to close the sickle-blades when in the act of pruning a plant.

The sickle-blades 3 and 4 are of similar construction, being rights and lefts, and are connected by a bolt or pivot fastening 8. The sickle-blades comprise a curved portion of approximately semicircular form and constituting a knife or blade proper and a straight portion forming the shank. The outer end portion of the shank 9 of each sickle-blade is reduced and made rounding, as shown at 9', and is mounted in a sleeve 10, having a rounded stem 11, journaled in a sleeve 12, attached to the lower end of each of the handle-bars by means of a plate or shank 13. The sleeves 12 and their plates or shanks 13 are in line with the respective handle-bars and are bolted or otherwise attached thereto, the plates or shanks 13 being placed against the outer sides of the handle-bars to which they are attached. The sleeves 10 are journaled by means of their stems 11 to the sleeves 12, so as to turn and enable the shanks of the sickle-blades to be moved, so as to effect an opening and closing of the sickle-blades when the implement is in operation. To avoid binding and enable the opening and closing of the sickle-blades, it is necessary that their rounded ends 9 be journaled in the sleeves 10.

A brace 14 is interposed between the handle-bars and the sickle-blades, and its upper end is connected to the handle-bars by the bolt or pivot fastening 5, and its lower end is secured to the sickle-blades by means of the pivot-fastening 8. In order to allow for the variation of the distance between the pivot-fastenings 5 and 8 when opening and closing the sickle-blades, so as to obviate binding between the parts entering into the formation of the swivel-joints, it has been found necessary to provide for an automatic lengthening and shortening of the brace, and to this end a spring portion 15 is interposed in the length of the brace and, as shown, consists of an arch or curve the side members of which are adapted to move apart to allow for a lengthening of the brace and to spring together to effect a shortening of the brace when the sickle-blades are open. The brace 14 is preferably constructed of spring metal, and a portion, as 15, is curved or arched. It is not essential to have the spring portion 15 an integral part of the brace, although this is the preferable construction. The brace is strengthened laterally by means of a stay 16, which spans the open end of the arch or spring portion 15, one end of the stay being rigidly attached to the brace at one side of the arch and the opposite end having a sliding connection with the brace at the opposite side of the arch. The movable end of the stay has a longitudinal slot 17 to receive a headed stud 18, applied to the proximal end of the brace 14.

The sickle-blades are located in a plane about at a right angle to the plane of the handle-bars, and the latter are of a length to enable the operator to use the implement without stooping. The grips 6 are held in opposite hands of the operator and are moved apart to separate or open the sickle-blades, which are then fitted about the strawberry-plant or other growth to be pruned, and the runners are lifted by means of the sickle-blades and are cut off simultaneously with the top of the plant at the proper distance from the ground, the sickle-blades being closed by bringing the upper ends of the handle-bars together and causing them to pass by one another, as will be readily understood.

The shear-blades and the brace 14 are stayed against lateral movement by means of a frame consisting of a cross-bar 19, parallel side bars 20, and a V-shaped end bar 21, the arms of the part 21 being hinged to allow for the variation in the inclination of the brace due to opening and closing the shear-blades when the implement is in operation. The cross-bar 19 is secured to the front handle-bar, and the lower end of the V-shaped bar 21 is secured to the brace 14 at a point above the arch 15. The purpose of this frame is to prevent lateral movement of the brace and to stiffen the shear-blades and enable the user to operate the implement with certainty and ease.

Having thus described the invention, what is claimed as new is—

1. In combination with pivoted handle-bars, coöperating blades having loose connection with the respective handle-bars and extending about at a right angle thereto, and an automatically-extensible brace between the handle-bars and blades, substantially as set forth.

2. In combination with pivoted handle-bars, coöperating blades having loose connection with the respective handle-bars and extending about at a right angle thereto, and a brace interposed between the handle-bars and blades and having a spring portion in its length to admit of the brace automatically lengthening and shortening, substantially as set forth.

3. In combination with pivoted handle-bars, coöperating blades having loose connection with the respective handle-bars and extending about at a right angle thereto, a brace interposed between the handle-bars and blades and having a spring portion in its length in the form of an arch or curve, and a stay spanning the open side of the arch and having rigid connection at one end with the brace at one side of the arch and having slidable connection at its opposite end with the brace upon the opposite side of the arch, substantially as set forth.

4. In combination with pivoted handle-bars, coöperating blades having loose connection with the respective handle-bars and extending about at a right angle thereto, and a brace between the handle-bars and blades and connected thereto by the respective pivot-fastenings, substantially as set forth.

5. In combination, pivoted handle-bars, blades pivoted intermediate of their ends, and means connecting the shanks of the blades with the ends of the handle-bars by swivel-joints, substantially as set forth.

6. In combination with handle-bars pivoted at a point between their ends, and coöperating blades pivoted intermediate of their ends, of sleeves secured to the handle-bars and having openings in line therewith, other sleeves arranged at a right angle to the first-mentioned sleeves and having stems journaled therein, and connections between the coöperating blades and the lowermost sleeves and journaled in the latter, substantially as set forth.

7. In combination with pivoted handle-bars and coöperating blades having loose connection with the respective handle-bars extending about at a right angle thereto, a brace interposed between the handle-bars and blades, and a frame secured at its upper end to one of the handle-bars and at its lower end to the brace and adapted to prevent lateral movement of the brace and blades, substantially as set forth.

8. In combination with pivotal handle-bars and coöperating blades having loose connection with the respective handle-bars and extending about at a right angle thereto, an extensible brace interposed between the handle-bars and blades, and a frame secured at one end to a handle-bar and at its opposite end to the brace and having a hinge-joint intermediate of its ends, said frame staying the brace laterally and preventing sidewise movement of the blades, substantially as set forth.

In testimony whereof we affix our signatures in presence of two witnesses.

CHARLES W. REED. [L. S.]
JOHN HAKEL. [L. S.]

Witnesses:
WM. THOMPSON,
CHAS. L. ROGERS.